Feb. 7, 1961     D. J. REYNOLDS     2,970,565
MOSQUITO EGG HARVESTER
Filed Jan. 27, 1960
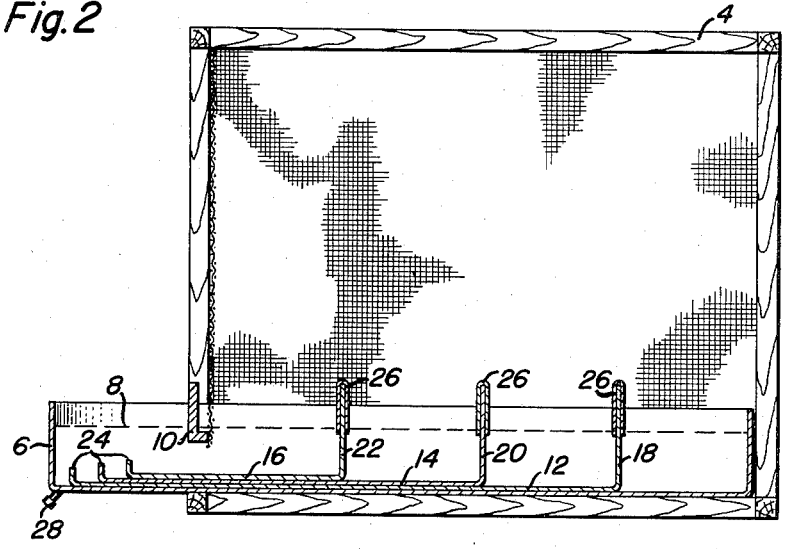
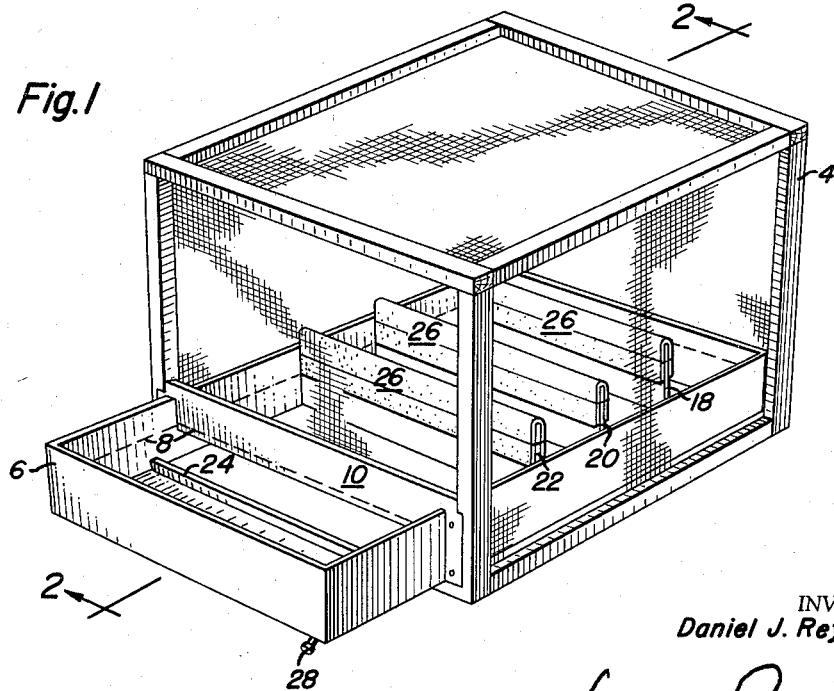
INVENTOR
Daniel J. Reynolds
BY George Renehan
ATTORNEY

United States Patent Office 2,970,565
Patented Feb. 7, 1961

2,970,565

MOSQUITO EGG HARVESTER

Daniel J. Reynolds, Cleveland, Ohio, assignor to the United States of America as represented by the Secretary of the Army Filed Jan. 27, 1960, Ser. No. 5,079

3 Claims. (Cl. 119—17)

(Granted under Title 35, U.S. Code (1952), sec. 266)

The invention described herein may be manufactured and used by or for the Government of the United States of America for governmental purposes without the payment to me of any royalty thereon.

This invention relates to an apparatus and method for harvesting mosquito eggs.

The Aedes mosquito oviposits eggs on moist surfaces. The usual procedure in mosquito egg production is to insert moistened paper towels into the cage wherein the mosquitoes are confined through a sleeve opening in the cage. After the eggs have been oviposited, the papers are removed and replaced with new papers. This latter operation is somewhat inconvenient and usually brings about the loss of mosquitoes as well as subjecting the operator to mosquito bites.

The present invention provides a structure and method which avoids all of the above objections and makes it possible to secure mosquito eggs conveniently, with no loss of mosquitoes and with no danger of mosquito bites. This is accomplished by means of the structure shown in the drawings where Fig. 1 shows a perspective of the structure and Fig. 2 shows a sectional view taken on line 2—2 with all the parts in position.

In the drawing, 4 shows the wire mesh cage with its structural framework and fine wire screen sides. A water tray is positioned on the bottom of the cage and projects beyond the front of the cage forming a moat 6. This tray is filled with water to a level shown at 8 and into which projects a baffle 10 which seals off the cage from the outside. Depositing plates 12, 14 and 16 which are of diminishing length, each traverse the width of the tray and are positioned such that risers 18, 20 and 22 at one end of the plates project above the water within the cage. At the other end of these plates are small flanges 24 which serve as hand holds to permit inserting and withdrawing the plates. Pieces of blotting paper 26 are bent over the top of each of the risers and are held in position with rubber bands. These papers project into the water and are kept moist continually. In using this equipment the mosquitoes are placed in the cage and the water admitted until the level rises above the baffle 10 to seal the structure. Then plates 18, 20 and 22 with the blotting paper attached are inserted through the water barrier. When eggs have been deposited, the plates are removed in reverse order to that of their insertion and the blotting papers are then replaced and the eggs are conditioned and stored on the paper until utilized. During this replacement process, the cage is sealed at all times and no mosquitoes can escape. A spigot 28 may be fitted to the front of the water tray to facilitate draining or lowering the water level.

It is to be understood that several variants are possible within the scope of this invention. Thus, although three depositing plates are shown, the invention contemplates the use of any number of plates depending on the size and depth of the apparatus used. Similarly, although the structure shows a tray fitted in the bottom of the cage, the cage can in fact be set in and partially immersed in the tray, the only requirement being that entrance to the cage shall be effectively sealed by the water in the tray.

I claim:

1. A mechanism for harvesting mosquito eggs comprising a perforated mosquito tight cage, a tray in the bottom of said cage, water partially filling said tray, said tray extending beyond the cage on one side thereof forming a moat, the side of the cage extending down into said moat forming a seal when the tray is partially filled with water, a U-shaped plate positioned in the bottom of said tray, one leg of said plate projecting above the water within the cage, the other leg of said plate projecting upward in the moat outside of said cage to permit the entire plate to be inserted and withdrawn through the water seal in the moat.

2. A structure in accordance with claim 1 wherein a plurality of nested U-shaped plates are employed, the base of the U being progressively shorter with each superposed plate.

3. A structure in accordance with claim 2 wherein the two legs of the U-shaped plates are of unequal length, the longer leg projecting above the water within the cage and the shorter leg projecting up in the water within the moat.

No references cited.